United States Patent [19]
Bosisio et al.

[11] Patent Number: 5,179,619
[45] Date of Patent: Jan. 12, 1993

[54] OPTICAL FIBRE ELEMENT COMPRISING A POLYACRYLATE COATING LAYER RETICULATED BY UV RADIATION AND AN $H_2$-ABSORBING BUFFER

[75] Inventors: Claudio Bosisio, Brembate Sotto; Antonio Campana, Milan, both of Italy

[73] Assignee: Pirelli Cavi S.p.A., Milan, Italy

[21] Appl. No.: 783,280

[22] Filed: Oct. 28, 1991

[30] Foreign Application Priority Data

Nov. 13, 1990 [IT] Italy ................. 22035 A/90

[51] Int. Cl.$^5$ ............................................... G02B 1/00
[52] U.S. Cl. ................................... 385/141; 385/144; 385/128
[58] Field of Search ................ 385/100, 141, 144; 502/159

[56] References Cited

U.S. PATENT DOCUMENTS 4,904,047  2/1990  Powell et al. ............... 385/141

FOREIGN PATENT DOCUMENTS

| | | |
|---|---|---|
| 0111280 | 6/1984 | European Pat. Off. . |
| 280279 | 8/1988 | European Pat. Off. . |
| 2200535 | 4/1974 | France . |
| 2021282 | 11/1979 | United Kingdom . |
| 1598540 | 9/1981 | United Kingdom . |
| 2099173 | 12/1982 | United Kingdom . |
| 2164471 | 8/1985 | United Kingdom . |
| 2163172 | 2/1986 | United Kingdom . |
| 2170921 | 8/1986 | United Kingdom . |
| 2172410 | 9/1986 | United Kingdom . |
| 2174822 | 11/1986 | United Kingdom . |

OTHER PUBLICATIONS

Patent Abstracts of Japan, vol. 12, No. 114 (P-688) (2961) Apr. 12, 1988 & JP-A-62 245 208 (Furukawa) Oct. 26, 1987.

*Primary Examiner*—John D. Lee
*Assistant Examiner*—John Ngo
*Attorney, Agent, or Firm*—Brooks Haidt Haffner & Delahunty

[57] ABSTRACT

The optical fiber element comprises at least one layer of coating constituted by a polyacrylate reticulated by UV radiation and at least one $H_2$-absorbing buffer, said polyacrylate comprising at least one photo-initiator of UV reticulation possibly together with an activator for it wherein said photo-initiator and its activator, if any, are selected from the group which comprises those photo-initiators and those activators which cause a reduction in the hydrogen absorption capacity of less than 30% in a $H_2$-absorbing buffer which has been in contact with said polyacrylate containing them for 30 days at 100° C. in an air atmosphere saturated with water vapor at 150 mbar.

8 Claims, 2 Drawing Sheets

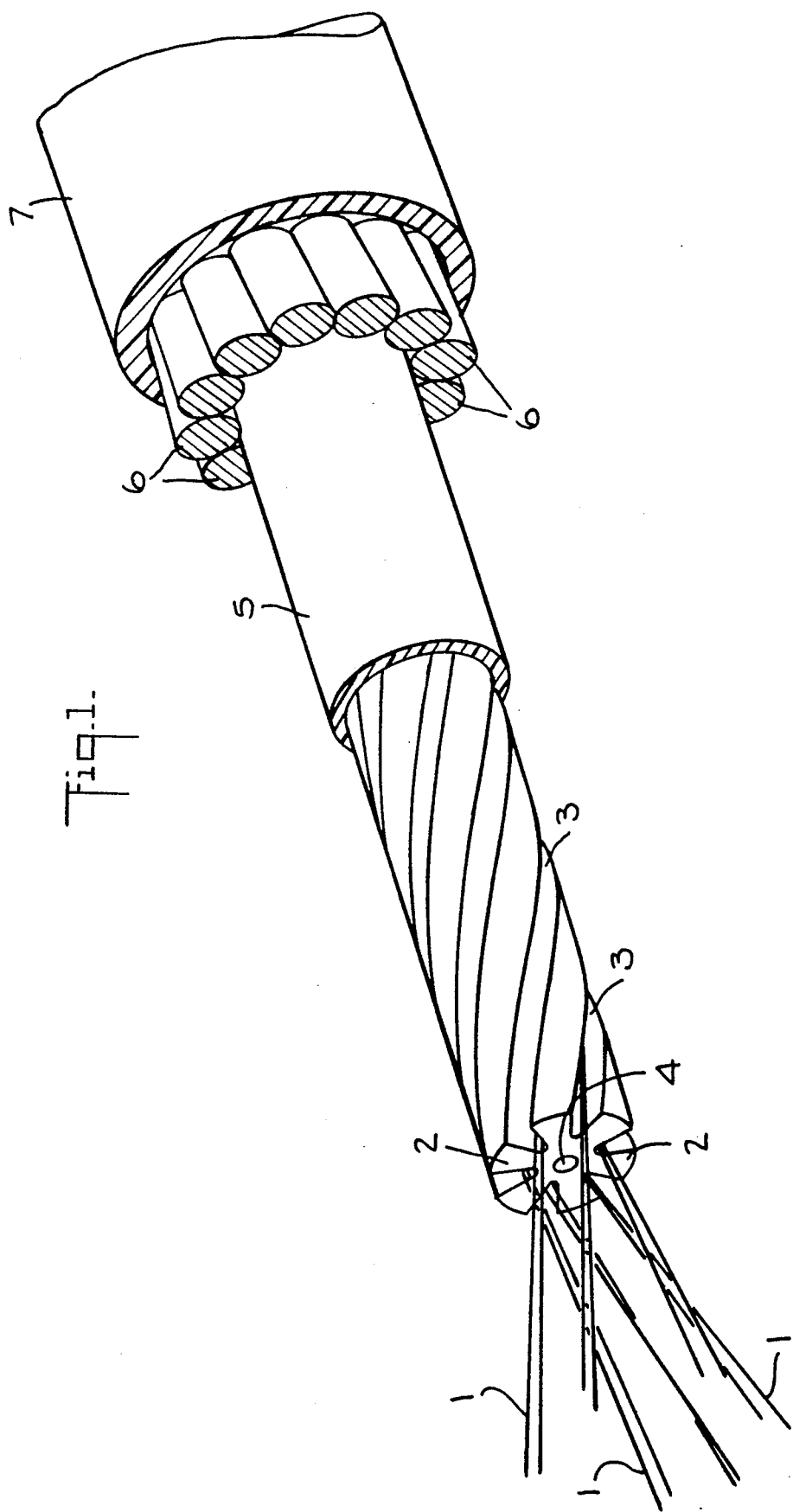

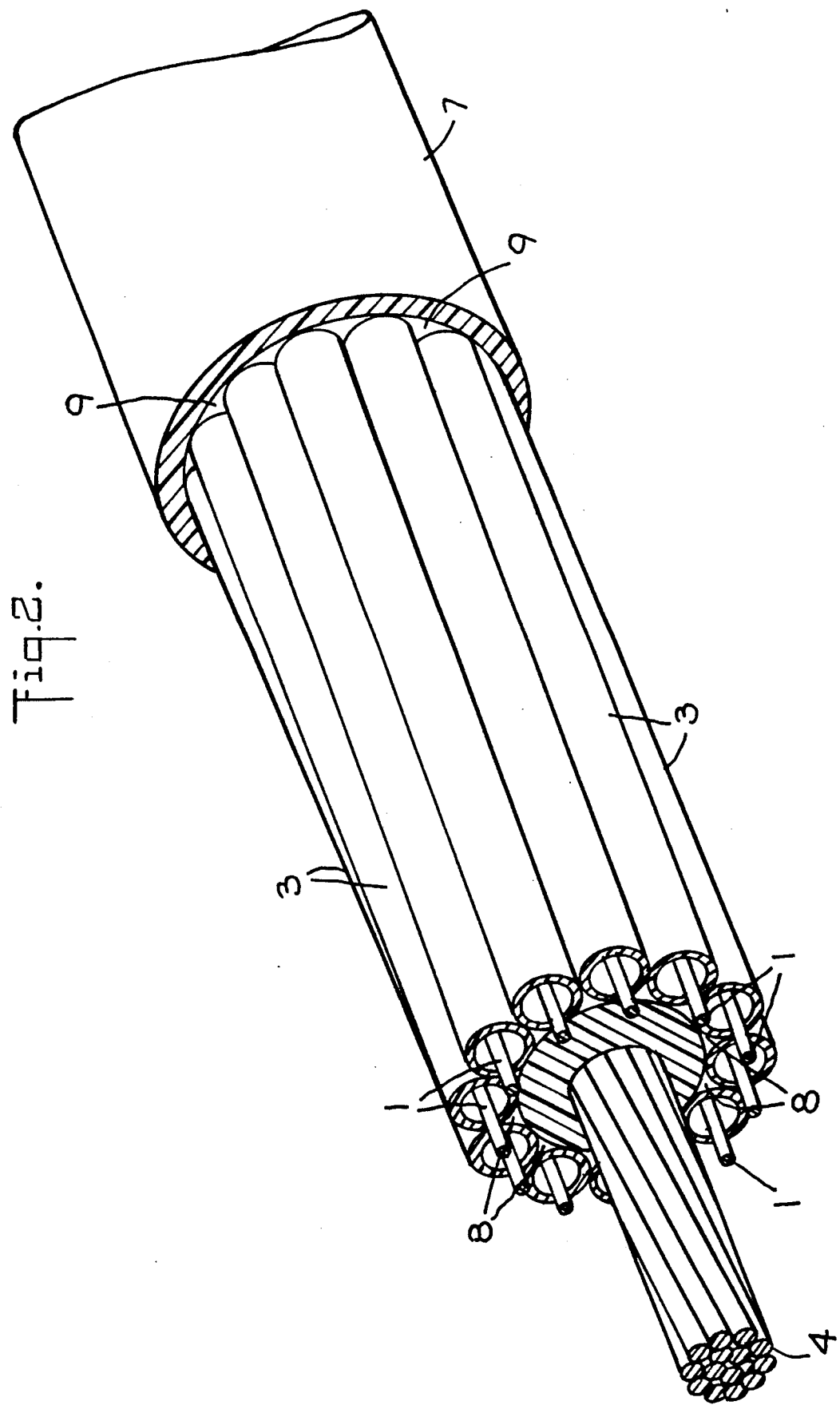

OPTICAL FIBRE ELEMENT COMPRISING A POLYACRYLATE COATING LAYER RETICULATED BY UV RADIATION AND AN $H_2$-ABSORBING BUFFER

DESCRIPTION

The present invention relates to an optical fibre element which comprises a polyacrylate coating layer reticulated by UV radiation and an $H_2$-absorbing buffer.

During the course of the present description and of the claims which follow the expression "optical fibre element" is used to indicate elements for the transmission and/or processing of optical signals such as, for example, optical fibre cables, joints for optical fibre cables, terminals for optical fibre cables, amplifiers with active core optical fibre, optoelectrical repeaters, optical fibre sensors and such like.

It is known that, to enable them to be handled, optical fibres are coated with a polyacrylic protective sheath reticulated by UV radiation.

Said sheath of polyacrylates reticulated by UV radiation consists preferably of a primary coating, of a secondary coating and, possibly, of an external coloured layer.

Said sheath is usually obtained from mixtures of prepolymers (oligomers) having an acrylic base with reactive functional diluents, a photo-initiator and other secondary additives; according to the photo-initiator used, it is sometimes also necessary to add an activator. In the case of the primary and secondary coating, the respective mixtures are applied during the spinning step and reticulated on line by UV radiation; in the case of the coloured layers, it is on the other hand preferred to apply the suitable mixture at a later stage to the fibre already protected by the primary and secondary layers.

It is also known that other layers of polyacrylate reticulated by UV radiation can be present in optical fibre elements having a more complex structure such as, for example, optical fibre tapes.

It is lastly known that hydrogen exerts harmful effects on optical fibres and jeopardize their efficiency. It has therefore been proposed to incorporate, in the optical fibre elements, some compositions capable of capturing hydrogen before it exerts its harmful effects on the fibres.

In the title, description and claims said compositions are, for short, indicated with the expression "$H_2$-absorbing buffers".

The Applicant has developed $H_2$-absorbing buffers substantially consisting of compositions comprising at least one unsaturated organic compound of silicon and at least one hydrogenation catalyst selected from the group comprising the salts and the organic compounds of transition metals. Examples of these compositions are described in the U.S. Pat. No. B-4,688,889 and in the U.S. patent applications Ser. No. 07/723,441 and 07/722,085, both filed Jun. 27, 1991.

It has now been unexpectedly observed that that some polyacrylates reticulated by UV radiation poison the hydrogenation catalyst, based on transition metals, of the $H_2$-absorbing buffers. Studies carried out with the object of identifying the cause of such poisoning have shown that the capacity to inactivate the $H_2$-absorbing buffer is not an intrinsic characteristic of said polyacrylates but is to be looked for in some compounds added in order to foster UV radiation.

More in particular, it has been found that said poisoning is due to some photo-initiators of UV reticulation and/or to some activators, used together with with some photo-initiators, in spite of the fact that, on occasion, their quantity is only of the order of $10^{-4} + 10^{-5}$ parts by weight with respect to the quantity of $H_2$-absorbing buffer in contact with the polyacrylate reticulated by UV radiation.

It has also been found that the poisoning of the hydrogenation catalyst also takes place when the poisoning photo-initiators and/or activators are incorporated in only the primary coating of the fibre and not in the secondary coating in direct contact with the $H_2$-absorbing buffer.

The photo-initiators and the activators which inactivate the $H_2$-absorbing buffer are identified by means of a test, described in detail later, with which it is possible to measure the quantity of hydrogen absorbed by a $H_2$-absorbing buffer before and after it has been placed in contact with the polyacrylate, reticulated by UV radiation, for 30 days at 100° C. in an air atmosphere saturated with water vapour at 150 mbar. On the basis of the experience acquired it has been established that the photo-initiators and/or their activators can be considered non-inactivators when the capacity of residual absorption of the $H_2$-absorbing buffer, which has been in contact with the polyacrylate reticulated by UV radiation for 30 days at 100° C. in an air atmosphere saturated with water vapour at 150 mbar, is greater than 70%.

In one embodiment, the present invention relates to an optical fibre element comprising (a) at least one layer of coating constituted by a polyacrylate reticulated by UV radiation and (b) at least one $H_2$-absorbing buffer, said polyacrylate comprising at least one photo-initiator of UV reticulation possibly together with an activator for it, characterized in that said photo-initiator and its activator, if any, are selected from the group comprising those photo-initiators and those activators which cause a reduction in the hydrogen absorption capacity of less than 30% in a $H_2$-absorbing buffer which has been in contact with said polyacrylate containing them for 30 days at 100° C. in an air atmosphere saturated with water vapour at 150 mbar.

In a further embodiment, the present invention relates to an optical fibre cable comprising (a) at least one layer of coating constituted by a polyacrylate reticulated by UV radiation and (b) at least one $H_2$-absorbing buffer, said polyacrylate comprising at least one UV radiation photo-initiator, possibly together with an activator for it, characterized in that said photo-initiator and its activator, if any, are selected from the group comprising those photo-initiators and those activators which cause a reduction in the hydrogen absorption capacity of less than 30% in a $H_2$-absorbing buffer which has been in contact with said polyacrylate containing them for 30 days at 100° C. in an air atmosphere saturated with water vapour at 150 mbar.

A typical example of $H_2$-absorbing buffer suitable for determining whether a photo-initiator and its activator, if any, causes a reduction in the hydrogen absorption capacity after having been in contact, for 30 days at 100° C. in an air atmosphere saturated with water vapour at 150 mbar, with a polyacrylate containing them is that described in example 1 of the U.S. Pat. No. 4,688,889; said $H_2$-absorbing buffer is substantially constituted by (a) 90 parts by weight of a vinyl-terminated dimethylsiloxane, with no chain unsaturations and having a content of unsaturated groups equal to 7.4 mmol per 100 g of product, b) 0.2 parts by weight of palladium powder having an average size 48 microns and (c) 10 parts by weight of colloidal silica.

Examples of optical cables and of components thereof in the production of which it is useful to refer to the present invention are those described in the following documents: U.S. Pat. No. 4,688,889; UK-A-2,172,410; EP-A-280,275; FR-A-2,200,535; UK-A-1,598,540; UK-A-2,021,282;; UK-A-2,099,173; UK-A-2,164,471; UK-A-2,170,921; UK-A-2,174,822; U.S. Pat. No. 4,143,942; U.S. Pat. No. 4,153,332; U.S. Pat. No. 4,199,224; U.S. Pat. No. 4,491,386; U.S. Pat. No. 4,491,387;; U.S. Pat. No. 4,676,590 and U.S. Pat. No. 4,690,498.

The use of the barrier composition of the invention in connection with optical fiber cables of the type shown in U.S. Pat. Nos. 4,688,889 and 4,725,123 is illustrated in the accompanying drawings in which:

FIG. 1 is a perspective view of an optical fiber cable of the type shown and described in U.S. Pat. No. 4,688,889 and including the barrier composition of the invention; and FIG. 2 is a perspective view of an optical fiber cable of the type shown and described in U.S. Pat. No. 4,725,123 and including the barrier composition of the invention.

The cables shown in FIGS. 1 and 2 are merely an example of optical fiber cables with which the barrier mixture of the invention may be used since it will be apparent to those skilled in the art that the barrier mixture may be incorporated in optical fiber cables of different types.

As shown in FIGS. 1 and 2, the optical fiber cables comprise suitable seats 3 for housing optical fibers 1. The said seats 3 may be helical grooves (FIG. 1) made in a core 2 made of plastic material or small plastic tubes (FIG. 2). The seats 3 are associated with sheaths 5 and 7 preferably made of plastic material as well as with elements 4 and 6 resistant to the traction.

As known to the person skilled in the art, the elements resistant to the traction are axially and/or peripherally located depending on the expected use of the cable and the manufacturing technology.

The element 4 in FIGS. 1 and 2 may be made of fiber rinforced resin or metal wire or wires, while the elements 6 in FIG. 1 may be high strenght fibers, such as aramidic fibers, or metal wires.

In FIG. 1, the grooves 3 housing the optical fibers 1 are filled with the barrier mixture of the invention.

In FIG. 2, the barrier mixture fills the small plastic tubes 3 housing the optical fibers and/or the inner recesses 8 and/or the outer recesses 9 surrounding the small plastic tubes 3. Thus, the small plastic tubes 3 in FIG. 2 can be filled and/or surrounded by the barrier mixture of the invention.

Examples of suitable photo-initiators according to the present invention are those which do not contain any atoms of nitrogen, phosphorus or sulphur in their molecule and which do not require the addition of amino activators.

Examples of suitable photo-initiators which do not contain any atoms of nitrogen, phosphorus or sulphur in their molecule and which do not require the addition of amino activators are benzoin and its alkyl ethers, acetophenone, dialkyl acetophenones, anthraquinone and its derivatives.

Typical examples of photo-initiators according to the present invention are benzophenone, diethoxyacetophenone, dimethoxyphenylacetophenone, hydroxycyclohexylphenylketone and 2-hydroxy-2-methyl-1-phenylpropanone.

The following tests and examples are used to illustrate the present invention without, however, limiting it in any way.

TESTS

The capacity of absorbing hydrogen on the part of $H_2$-absorbing buffers was assessed by measuring the pressure drop in a hermetically-sealed container, containing the $H_2$-absorbing buffer under examination in a hydrogen atmosphere. The apparatus used is an automatic commercial apparatus for the measurement of pressure in a range from 1000 to 1 mbar. The apparatus is accomplished by assemblying a fixed-volume chamber provided with two valves (one of which is the pin-type to regulate the supply of hydrogen and the other of the usual type for connection to a vacuum pump) with a commercial pressure transducer type E 8510 connected to a commercial digital reader, both made by the firm Edwards Alto Vuoto S.p.A. . Inside the apparatus there is a glass container. The control unit providing a digital reading of the pressure has a resolution of 1 mbar and the pressure indication is independent of the composition of the gas and of atmospheric pressure. The tests have been carried out a constant temperature of 23° C.

After weighing the glass container to an accuracy of 0.01 g (weight A), the $H_2$-absorbing buffer under examination was placed in the container; the glass container was then weighed a second time (weight B).

The glass container holding the $H_2$-absorbing buffer under examination was inserted into the apparatus and vacuum was applied for about 1+2 hours. After leaving the system in a static vacuum for at least 12 hours, the container was connected to a hydrogen cylinder until the digital pressure indicator indicated the desired pressure (generally some 500 or 1000 mbar).

The hydrogen cylinder cock was closed and the time as well as the hydrogen pressure were noted.

After 24 hours the residual hydrogen pressure was read.

The hydrogen absorption capacity expressed in normal $cm^3/g$ was calculated with the following formula:

$$\frac{(P - Pr) \times V \times 273}{1013 \times (273 + C) \times (B - A)}$$

where
P = initial hydrogen pressure,
Pr = residual hydrogen pressure after 24 hours of test,
C = temperature, in °C., during the test,
V = free volume of the apparatus after insertion of the $H_2$-absorbing buffer under examination,
B = weight of the glass container with the $H_2$-absorbing buffer,
A = weight of the empty glass container.

For each sample of $H_2$-absorbing buffer the above test was carried out twice and the average of the two values obtained was made.

The above test was carried out on $H_2$-absorbing buffers before and after having been in contact with optical fibres coated or with coating material films according to the methods described below.

a) coated fibre

A section of coated optical fibre was used having a length such as to respect the fibre/$H_2$-absorbing buffer ratio existing in an optical fibre cable. Normally, such ratio is of 2 g of $H_2$-absorbing buffer for each meter of optical cable.

In the case of a single-fibre optical cable, the coated optical fibre was smeared with the $H_2$-absorbing buffer whose hydrogen absorption capacity had been measured previously with the method described above. The coated optical fibre treated in this way was made to age at 100° C. in a large sealed test tube in the presence of air (150 mbar) and saturated water vapour. After one month, the $H_2$-absorbing buffer was recovered and its residual hydrogen absorption capacity was measured with the method described above.

b) coating material

Three samples were prepared in the form of films having a thickness of 10–20 mm reticulating in depth with UV radiation respectively: the material used for forming the primary coating, the secondary coating and the coloured layer of the optical fibre. The samples were prepared using the quantity of material with which about 5 meters of optical fibre are coated. Each sample was smeared with 10 g of $H_2$-absorbing buffer for which the hydrogen absorption capacity had been determined previously with the method described above. Each sample was made to age as described under the previous point a); after one month, the $H_2$-absorbing buffer was recovered and its residual hydrogen absorption capacity was measured with the method described above.

EXAMPLE 1

| Mixture for forming a layer of non-poisoning primary coating: | |
|---|---|
| silicon acrylate (EBECRYL TM 350 by Radcure Specialties Inc., USA) | 55 g |
| aliphatic urethane acrylate (EBECRYL TM 230 by Radcure Specialties Inc., USA) | 10 g |
| hexandiole diacrylate (HDDA) | 15 g |
| isobornylacrylate | 15 g |
| diethoxyacetophenone | 5 g |
| hydrogen absorption capacity on the part of the $H_2$-absorbing buffer: initial = 1.65 normal $cm^3/g$ final = 1.38 normal $cm^3/g$ | |

EXAMPLE 2

| Mixture for forming a layer of poisoning primary coating: | |
|---|---|
| silicon acrylate (EBECRYL TM 350 by Radcure Specialties Inc., USA) | 55 g |
| aliphatic urethane acrylate (EBECRYL TM 230 by Radcure Specialties Inc., USA) | 10 g |
| hexandiole dyacrylate (HDDA) | 8 g |
| isobornylacrylate | 15 g |
| benzophenone | 5 g |
| aminoacrylate (UVECRYL TM P115 by Radcure Specialties Inc., USA) | 7 g |
| hydrogen absorption capacity on the part of the $H_2$-absorbing buffer: initial = 1.65 normal $cm^3/g$ final = 0.35 normal $cm^3/g$ | |

The comparison between examples 1 and 2 shows that the poisoning is to be attributed to the aminoacrylate (activator).

EXAMPLE 3

| Mixture for forming a layer of non-poisoning secondary coating: | |
|---|---|
| epoxy acrylate (EBECRYL TM 600 by Radcure Specialties Inc., USA) | 45 g |
| aromatic urethane acrylate (EBECRYL TM 210 by Radcure Specialties Inc., USA) | 5 g |
| methacrylic acid | 15 g |
| trimethylolpropane triacrylate (TMPTA) | 20 g |
| tripropylenglycol diacrylate (TPGDA) | 5 g |
| dimethoxyphenylacetophenone | 10 g |
| hydrogen absorption capacity on the part of the $H_2$-absorbing buffer: initial = 1.70 normal $cm^3/g$ final = 1.46 normal $cm^3/g$ | |

EXAMPLE 4

| Mixture for forming a layer of poisoning secondary coating: | |
|---|---|
| epoxy acrylate (EBECRYL TM 600 by Radcure Specialties Inc., USA) | 45 g |
| aromatic urethane acrylate (EBECRYL TM 210 by Radcure Specialties Inc., USA) | 7 g |
| methacrylic acid | 15 g |
| trimethylolpropane triacrylate (TMPTA) | 20 g |
| tripropylenglycol diacrylate (TPGDA) | 5 g |
| hydroxypropylphenyl ketone | 5 g |
| isopropylthioxanthone | 3 g |
| hydrogen absorption capacity on the part of the $H_2$-absorbing buffer: initial = 1.70 normal $cm^3/g$ final = 0.40 normal $cm^3/g$ | |

The comparison between examples 3 and 4 shows that the poisoning is to be attributed to the isopropylthioxathone (activator).

EXAMPLE 5

| Mixture for forming a non-poisoning coloured (ink) layer: | |
|---|---|
| polyester urethane acrylate (EBECRYL TM 810 by Radcure Specialties Inc., USA) | 44 g |
| tripropylenglycol diacrylate (TPGDA) | 10 g |
| trimethylolpropane triacrylate (TMPTA) | 25 g |
| white pigment ($TiO_2$) | 5 g |
| N-vinyl-2-pyrrolidone (diluent) | 10 g |
| 2-hydroxy-2-methyl-1-phenylpropane | 6 g |
| hydrogen absorption capacity on the part of the $H_2$-absorbing buffer: initial = 1.70 normal $cm^3/g$ final = 1.50 normal $cm^3/g$ | |

EXAMPLE 6

| Mixture for forming a poisoning coloured (ink) layer: | |
|---|---|
| polyester urethane acrylate (EBECRYL TM 810 by Radcure Specialties Inc., USA) | 44 g |
| tripropylenglycol diacrylate (TPGDA) | 10 g |
| trimethylolpropane triacrylate (TMPTA) | 25 g |
| white pigment ($TiO_2$) | 5 g |
| N-vinyl-2-pyrrolidone (diluent) | 9 g |
| benzophenone | 4 g |
| 4,4'-bis(dimethylamino)benzophenone | 3 g |
| hydrogen absorption capacity on the part of the $H_2$-absorbing buffer: initial = 1.70 normal $cm^3/g$ final = 0.48 normal $cm^3/g$ | |

The comparison between examples 5 and 6 shows that the poisoning is to be attributed to the 4,4'-bis(dimethylamino)benzophenone (photo-initiator).

We claim:

1. Optical fibre element comprising at least one layer of coating constituted by a polyacrylate reticulated by UV radiation and at least one $H_2$-absorbing buffer, said polyacrylate comprising at least one of a photo-initiator of UV recticulation without an activator and of a photo-initiator of UV reticulation with an activator, characterized in that said photo-initiator and said activator are selected from the group comprising those photo-initiators and those activators which cause a reduction in the hydrogen absorption capacity of less than 30% in a $H_2$-absorbing buffer which has been in contact with said polyacrylate containing said photo-initiator for 30 days at 100° C. in an air atmosphere saturated with water vapour at 150 mbar.

2. Optical fibre element according to claim 1, characterized in that the photo-initiators are selected from photo-initiators the molecules of which do not contain any atoms in the group consisting of nitrogen, phosphorus and sulphur and which do not require the addition of amino activators.

3. Optical fibre element according to claim 2, characterized in that the photo-inititors are selected from benzoin and alkyl ethers of benzoin, acetophenone, dialkyl acetophenones, anthraquinone and derivatives of anthroquinone.

4. Optical fibre element according to any preceding claim from 1 to 3, characterized in that the photo-initiators are selected from benzophenone, diethoxyacetophenone, dimethoxyphenylacetophenone, hydroxycyclohexylphenylketone and 2-hydroxy-2-methyl-1-phenylpropanone.

5. Optical fibre cable comprising at least one layer of coating constituted by a polyacrylate reticulated by UV radiation and at least one $H_2$-absorbing buffer, said polyacrylate comprising at least one UV radiation photo-initiator selected from photo-initiators not requiring an activator and photo-initiators requiring an activator, characterized in that said photo-initiator and said activator are selected from the group comprising those photo-initiators and those activators which cause a reduction in the hydrogen absorption capacity of less than 30% in a $H_2$-absorbing buffer which has been in contact with said polyacrylate containing said photo-initiator for 30 days at 100° C. in an air atmosphere saturated with water vapour at 150 mbar.

6. Optical fibre cable according to claim 5, characterized in that the photo-initiators are selected from photo-initiators the molecules of which do not contain any atoms in the group consisting of nitrogen, phosphorus and sulphur and which do not require the addition of amino activators.

7. Optical fibre cable according to claim 6, characterized in that the photo-initiators are selected from benzoin and alkyl ethers of benzoin, acetophenone, dialkyl acetophenones, anthraquinone and derivatives of anthroquinone.

8. Optical fibre cable according to any preceding claim from 5 to 7, characterized in that the photo-initiators are selected from benzophenone, diethoxyacetophenone, dimethoxyphenylacetophenone, hydroxycyclohexylphenylketone and 2-hydroxy-2-methyl-1-phenylpropanone.

* * * * *